United States Patent Office 3,278,625
Patented Oct. 11, 1966

3,278,625
PROCESS FOR THE PRODUCTION OF BUTADIENE
Stuart Neil Dancer, Epsom Downs, Surrey, and Frank Christopher Newman, Great Bookham, Surrey, England, assignors to The Distillers Company Limited, Edinburgh, Scotland, a British company
No Drawing. Filed July 26, 1962, Ser. No. 212,729
Claims priority, application Great Britain, Aug. 16, 1961, 29,494/61; June 1, 1962, 21,256/62
5 Claims. (Cl. 260—680)

This invention relates to the production of butadiene from butenes.

Processes for the production of butadiene by reacting butene-1 and/or butene-2 in the vapour phase with molecular oxygen over a catalyst at an elevated temperature are known. The gas stream issuing from the reactor contains butadiene, unreacted butenes, water, oxygen, nitrogen, carbon dioxide, carbon monoxide and traces of oxygenated compounds.

It has now been discovered that the reaction product also contains acetylene ($C_2H_2$). The presence of acetylene in the product is most undesirable, causing difficulties in the subsequent isolation of butadiene from unreacted butenes, and being an unacceptable impurity in the final product.

According to the present invention the process for the production of butadiene comprises reacting butene at an elevated temperature in the vapour phase with molecular oxygen over a catalyst and recovering from the reaction product butadiene at least substantially free from acetylene.

The catalysts employed in the process are of the type used in oxidation reactions. Examples of such catalysts are bismuth tungstate, bismuth molybdate, mixtures comprising tin oxide and antimony oxide, phosphoric acid/alumina and phosphoric acid/tin oxide.

The proportion of butene-1 and/or butene-2 in the feed may vary within fairly wide limits, for example within the range 1% to 20% by volume.

The concentration of oxygen in the reaction feed may vary within fairly wide limits, but it is preferred to operate with an oxygen concentration between 1% and 21% of the reaction mixture. The feed may also contains a gaseous diluent which is preferably substantially inert under the conditions of the reaction, and which may be for example, nitrogen and/or steam. If nitrogen is used as diluent, the nitrogen and oxygen requirement of the feed may be supplied in the form of air.

The reaction is preferably carried out at a temperature below 500° C., and particularly in the range 200° C.–500° C. The contact time may be, for example, within the range 1–30 seconds.

The butenes in admixture with molecular oxygen together if desired with a diluent are brought into contact with the catalyst in any suitable manner, for example in a fixed or fluidised bed reactor.

The recovery from the gaseous reaction product of butadiene and butenes substantially free from acetylene may be carried out in any suitable manner, for instance by condensation followed by fractional distillation or preferably by extraction of the gases with a preferential solvent for the butene/butadiene mixture, the butene/butadiene mixture being recovered from the solution substantially free from acetylene by distillation. Suitable solvents include substantially aromatic hydrocarbons such as xylene, cumene, mesitylene, and indene, alicyclic hydrocarbons such as tetralin and methyl cyclohexane, and especially aliphatic hydrocarbons or petroleum fractions containing a major proportion of aliphatic hydrocarbons, such as decane, nonane, white spirit, benzole wash oil and petroleum-ether fractions. The gaseous reaction product may be subjected to a preliminary water-wash before being extracted with the solvent. Butadiene is finally separated from the unreacted butenes by conventional methods such as extraction, distillation, or absorption for instance in cuprammonium acetate, the butene recovered being suitably recycled to the oxidation stage.

In one embodiment of the invention the gases issuing from the reactor are firstly scrubbed with water and are then passed to an extraction colum where they are contacted with a counter-current stream of solvent to effect preferential extraction of butadiene and unreacted butenes. The solvent preferentially extracts the butadiene and butenes from the gas stream at the expense of the acetylene, the major proportion of which passes off with the residual gases namely oxygen, nitrogen, carbon dioxide and carbon monoxide which are vented to the atmosphere. The resulting solution of butadiene and unreacted butenes in the solvent, having a reduced concentration of acetylene, is passed to a stripping column for removal of the solvent which is recycled to the extraction column.

Part of the gaseous $C_4$ olefine stream leaving the top of the stripping column may be recycled to the extraction column, this procedure resulting in a further reduction in the acetylene content of the gas stream finally obtained.

In accordance with a preferred embodiment, the gaseous $C_4$ olefine stream resulting from any of the above purifications for removal of substantially all the acetylene may be subjected to further purification to remove final traces of acetylene by an extractive distillation with an aqueous solution of acetonitrile. By use of this extractive distillation, final traces of acetylene are removed in an overhead fraction together with the butene content of the gas stream and high purity butadiene is recovered from the base product by a subsequent fractional distillation in a second stripping still, with condensation and fractionation, if necessary, of the butadiene stream.

The extractive distillation may be operated according to conventional methods at atmospheric or increased pressure.

The aqueous acetonitrile solution may vary in concentration as desired having regard to the acetylene concentration in the butadiene stream. Suitably the concentration of water in the aqueous acetonitrile is between 5 and 35% w./w.

The process of the present invention is illustrated further by reference to the following examples.

Example 1

A gaseous mixture of 10% by volume of butenes, 40% by volume of steam and 50% by volume of air was passed over a catalyst comprising a mixture of the oxides of tin and antimony contained in a reactor maintained at elevated temperature.

The butene/butadiene gases issuing from the reactor were found to contain 0.98% by volume of acetylene based on the butadiene present. The reactor gases were first washed with water and then passed to a second scrubbing column where they were scrubbed with xylene at such a rate as to remove 99% by volume of the butene/butadiene mixture from the gas stream. The spent xylene solution was passed to a stripping still where the butene/butadiene mixture was recovered by degassing. The desorbed gases from the stripping still were then recycled to the base of the second scrubbing column to contact fresh and/or recycle xylene. As a result of xylene scrubbing the reactor gases together with recycle of the desorbed gases from the stripping still a final gaseous mixture containing butene, butadiene and only 0.041% by volume of acetylene based on the butadiene present was obtained.

Example 2

The gas stream from a reactor operated under similar conditions to those used in Example 1 was found to contain 1.14% by volume of acetylene based on the butadiene present. After washing with water the gas stream was scrubbed with a light petroleum fraction (B.P. 140–160°) at such a rate as to remove 99% by volume of the butene/butadiene mixture from the gas stream. The resultant solution was stripped in a still to give a butene/butadiene stream containing 0.12% by volume of acetylene based on the butadiene present. With some recycle of the desorbed gases to the base of the absorption column the acetylene in the final butene/butadiene mixture from the head of the stripping still was reduced to only 0.05% by volume of the butadiene present.

Example 3

The gas stream from another reactor operated under similar reaction conditions to those used in Example 1 was found to contain 1.76% by volume of acetylene based on the butadiene present. After being washed with water the reactor gases were scrubbed, at 30 p.s.i.g., with a counter-current flow of a light petroleum fraction (B.P. 140–160°) at such a rate as to remove 98% by volume of the butene/butadiene mixture from the gas stream. The resultant solution was stripped in a still, also run at 30 p.s.i.g. with no recycle of the butene/butadiene head product. As a result of the absorption and stripping steps the final gaseous mixture contained 0.28% by volume of acetylene based on the butadiene present.

Example 4

A $C_4$ gas stream containing 36.7% v./v. of mixed butenes and 62.7% v./v. butadiene contaminated with 0.2% oxygen and 0.4% acetylene representing a product obtained by solvent extraction without recycle of a butene-butadiene reactant stream was fed at 40 litres/hour N.T.P. to an extractive distillation column. Aqueous acetonitrile containing 10% w./w. water was fed down the column at the rate of 1.0 litre/hour and the kettle temperature maintained at 40° C. The base product was pumped to a stripping still, from the head of which was obtained a substantially pure butadiene stream at the rate of 20 litres/hour N.T.P. No acetylene could be detected in this butadiene stream.

We claim:

1. A process for the production of butadiene which comprises reacting butene at an elevated temperature in the vapour phase with molecular oxygen over a catalyst to produce a mixture of butene and butadiene containing acetylene as an impurity, treating the mixture by solvent extraction with an organic liquid to remove acetylene therefrom, distilling the treated mixture, and recycling a portion of the distillate to the solvent extraction to reduce the acetylene content of the butadiene therein to not more than 0.05% by volume.

2. A process as claimed in claim 1 wherein the organic liquid is selected from the group consisting of xylene, cumene, mesitylene and indene.

3. A process as claimed in claim 1 wherein the catalyst is selected from the group consisting of bismuth tungstate, bismuth molybdate, mixtures of tin oxide and antimony oxide, phosphoric acid/alumina and phosphoric acid/tin oxide.

4. A process as claimed in claim 1 wherein the distillate containing butadiene is subjected to extractive distillation with an aqueous solution of acetonitrile to remove final traces of acetylene.

5. A process as claimed in claim 4 wherein the concentration of water in the aqueous acetonitrile is between 5 and 35% w./w.

References Cited by the Examiner
UNITED STATES PATENTS

| | | | |
|---|---|---|---|
| 2,364,377 | 12/1941 | Lawrence | 260—681.5 |
| 2,739,176 | 3/1956 | Reilly et al. | 260—681.5 |
| 2,991,320 | 7/1961 | Hearne et al. | 260—680 |
| 2,991,322 | 7/1961 | Armstrong et al. | 260—680 |
| 3,028,440 | 4/1962 | Arganbright | 260—680 |

PAUL M. COUGHLAN, Jr., *Primary Examiner.*

ALPHONSO D. SULLIVAN, *Examiner.*